United States Patent [19]

Hugelin et al.

[11] 4,088,442

[45] May 9, 1978

[54] TEMPORARY CARRIERS AND A PROCESS FOR DRY TRANSFER PRINTING

[75] Inventors: Bernard Hugelin, Gaillard, France; Claude-Alain Blanc, Bernex; Charles Serex, Moillesulaz, both of Switzerland

[73] Assignee: Sublistatic Holding S. A., Glaris, Switzerland

[21] Appl. No.: 672,960

[22] Filed: Apr. 2, 1976

Related U.S. Application Data

[63] Continuation of Ser. No. 547,093, Feb. 4, 1975, abandoned.

[30] Foreign Application Priority Data

| | | |
|---|---|---|
| Feb. 28, 1974 | Switzerland | 2814/74 |
| Mar. 19, 1974 | Switzerland | 3763/74 |
| Apr. 11, 1974 | Switzerland | 5159/74 |

[51] Int. Cl.$^2$ .............................. D06P 5/20
[52] U.S. Cl. ..................... 8/2.5 A; 8/2.5 R; 8/39 B; 428/913
[58] Field of Search .................. 8/2.5 R, 2.5 A, 39 B; 428/913, 537

[56] References Cited

U.S. PATENT DOCUMENTS

| | | | |
|---|---|---|---|
| 3,707,346 | 12/1972 | Markert et al. | 8/2.5 |
| 3,792,968 | 2/1974 | Rickenbacher et al. | 8/2.5 |

*Primary Examiner*—Stanford M. Levin
*Attorney, Agent, or Firm*—Wenderoth, Lind & Ponack

[57] ABSTRACT

Flexible temporary carriers for dry transfer printing or dyeing, characterized in that they carry a multi-colored print or a print of a single color, produced by means of one or more dyestuffs which can vaporize or sublime below 250° C and at least one of which is either a (dialkylamino)-anthraquinone of which at least one alkyl radical is an isopropyl radical and which carries in the 2- and 3-position one hydrogen atom, or a 1-aminoanthraquinone which carries, in the 2-position, an ethoxy, methoxy or methyl group, a hydrogen atom or, preferably, a halogen atom and especially a chlorine atom and, in the 4-position, a hydrogen atom or a hydroxyl group, the other dyestuffs optionally present on this carrier behaving in the same way when exposed to heat between 150° and 250° C at atmospheric pressure and use thereof for dry dyeing or dry printing synthetic polyamides.

10 Claims, No Drawings

TEMPORARY CARRIERS AND A PROCESS FOR DRY TRANSFER PRINTING

This application is a continuation of application Ser. No. 547,093, filed Feb. 4, 1975, now abandoned.

It is known that it is possible to print and to dye synthetic materials by means of the so-called dry thermoprinting technique, employing sublimable dyestuffs. This technique is described, for example, in French Pat. Nos. 1,223,330 and 1,585,119.

A major disadvantage of this procedure is the low extent to which the dyestuffs penetrate into the material to be dyed (or printed); the dyestuffs remain at the surface so that, if this technique is applied to materials of a particular thickness, such as, for example, carpets (materials which are not easy to print and for which this technique possesses genuine advantages), one encounters the difficulty of causing the dyestuffs to penetrate into the material sufficiently deeply so that, under the surface print, the inside of the material does not remain uncoloured and that, for example in the case of carpets, the pile is coloured over its entire length and not only at its upper part.

This disadvantage has been overcome by using complicated equipment which enables dyestuffs to be transferred in vacuo. in addition to the fact that this equipment is more complex than that usually employed in thermoprinting, it does not make it possible to work continuously and, for this reason too, has not been used very extensively, so that dry thermoprinting of carpets remains an unsolved problem.

It has now been found, by the applicant company, (and this is one of the subjects of the present invention) that it is possible to dye and/or print, in depth, synthetic materials, and more particularly synthetic polyamides especially velvet-pile and long-pile carpets, felts and looped carpets or those of the so-called "tufted" type, by using transfer-papers or other flexible carriers which possess at least one di-(alkylamino)-anthraquinone of which at least one of the alkyl radicals is an isopropyl (radical), and preferably 1,4-di-(isopropylamino)-anthraquinone or 1,5-di-(isopropylamino)-anthraquinone, or a 1-amino-anthraquinone which possesses, in the 2-position, an ethoxy, methoxy or methyl group, a hydrogen atom or, preferably, a halogen atom and especially a chlorine atom, and, in the 4-position, a hydrogen atom or a hydroxyl (group).

The transfer-papers of this type, which are the subject of the present invention, are prepared in accordance with customary methods, described, for example, in French Pat. Nos. 1,223,330, 1,585,119 (PRO-1) and 2,076,149 (6,937), by using, as dyestuffs, known aminoanthraquinones such as 1-amino-4-hydroxy-anthraquinone or its derivative which carries a methoxy group in the 2-position, and preferably 1-amino-2-methylanthraquinone or 1-amino-2-chloro-4-hydroxy-anthraquinone, or 1,4-di-(isopropylamino)-anthraquinone or 1,5-di-(isopropylamino)-anthraquinone.

The dyestuffs which characterise the present invention can be used individually or as mixtures with dyestuffs which behave in a similar way when exposed to heat within the temperature range wherein transfer takes place, that is to say at 150°–250° C; by "similar behaviour when exposed to heat", there is meant the amount of dyestuff vaporised or sublimed within a given period of time at a given temperature.

The designs or patterns can be covered with a colourless thermoplastic film which causes the transfer-papers to adhere when hot to the materials to be decorated; the film can be produced, for example, using polyvinyl alcohol or a cellulosic binder which is soluble in organic solvents, or by means of an acrylic resin, a polyamide, a polyvinyl acetate or chloride, a polybutyral or a copolymer of vinyl acetate and ethylene or vinyl chloride.

Using the transfer-papers produced with the dyestuffs mentioned above by offset printing, by photogravure of flexographic printing, or by printing with a flat or rotating flame, it is possible to effect printing or dyeing, in particular of polyamide carpets, in the same way as for ordinary woven fabrics, either discontinuously on presses, or continuously on calenders; the only difference from the prior technique is that more dyestuff is placed on the paper in order to produce the same shade, otewise paler shades are obtained. The time taken to effect transfer can also be longer (30 to 300 seconds instead of 10 to 50) in order to allow the dyestuff to penetrate right through the material to be printed.

Thick polyamides made of staple fibre, or filament carpets made of polyamide, felts, moquettes and other polyamide-type materials of a particular thickness which have been dyed or printed according to the present process, possess, in contrast to those which are printed according to the known technique, prints (and dyeings) which have penetrated deeply. Despite the simplicity of the present process, the penetration of the dyestuffs is at least as good as that which can be achieved according to the process which takes place in equipment which makes transfer in vacuo possible.

Furthermore, the penetration in depth takes place in the same degree of strength when mixtures are used, and little or no difference in shade (nor any dichroism) is observed, for example, between the top and the bottom of the pile which is dyed uniformly, only the intensity varying with the depth.

Finally, the light fastness properties, and in particular certain fastness properties obtained on polyamides, are satisfactory.

In the following non-limiting examples, the parts and percentages given are expressed by weight, unless otherwise indicated, and the temperatures are in degrees Centigrade.

EXAMPLE 1

An ink is prepared by dispersing 10 parts of carefully ground 1,4-di-isopropylamino-anthraquinone with 7 parts of ethylcellulose (N 7) in 83 parts of ethyl alcohol. A strip of vegetable parchment, of width 1.60 m, is printed, by photogravure, using this ink and an inking roller so as to produce a blue design on a white background, and the whole is dried.

A looped moquette made of polyamide is placed on the sheet of paper thus printed and the whole is passed over a metal plate heated to 200° C. A second unheated plate ensures uniform contact. The duration of hot contact is 80 seconds. A faithful transfer onto the moquette is thus achieved.

Instead of a looped moquette, it is possible to use a polyamide carpet (polyhexamethylene adipamide or ε-caprolactam polymer) with a short nap, and excellent penetration of the dyestuff, which dyes the pile over its entire length, it also achieved, as well as good light fastness.

It is also possible to work continuously on a calender, adjusting the speeds of the printed paper and of the carpet to be printed in such a way that they remain in contact, for example for 50 seconds at 210°C.

By using 1,5-di-isopropylamino-anthraquinone instead of the 1,4-derivative, a red shade of excellent penetration is obtained.

It is also possible to produce a red shade by preparing an ink by dispersing 10 parts of carefully ground 1-amino-2-chloro-4-hydroxy-anthraquinone with 7 parts of ethylcellulose (N 7) in 83 parts of ethyl alcohol.

EXAMPLE 2

The procedure of Example 1 is followed, but an ink containing 8 parts of 1,4-di-isopropylamino-anthraquinone, 4 parts of 1-amino-2-chloro-4-hydroxy-anthraquinone and 8 parts of ethylcellulose (N 7) in 84 parts of ethyl alcohol is used. A violet design of excellent penetration is then obtained.

A violet design is also obtained by using a mixture of 4 parts of 1,4-di-isopropylamino-anthraquinone and 4 parts of 1,5-di-isopropylamino-anthraquinone.

In order to produce an olive-coloured design, it suffices to replace the 1-amino-2-chloro-4-hydroxy-anthraquinone by 1-amino-2-methyl-anthraquinone.

EXAMPLE 3

Orange and blue inks are prepared by dispersing, in the case of the orange ink, 8 parts of 1-amino-2-methyl-anthraquinone, and in the case of the blue ink, 8 parts of 1,4-di-isopropylamino-anthraquinone with, in each case, 6 parts of ethylcellulose (N 22) in 86 parts of ethyl alcohol. Using these inks and two inking rollers, a design is printed, by photogravure, on a strip of paper, and the whole is then dried.

The print thus produced is then coated with a thin layer of polyvinyl alcohol by means of one or more rollers and using a solution containing 6 parts of polyvinyl alcohol in 100 parts of water and 65 parts of ethyl or methyl alcohol, and the whole is dried.

In order to transfer the design from the strip of paper onto a carpet or a felt made of polyamide, the paper is placed in contact with the textile and the whole is passed over a metal plate heated electrically to 200° C. A second unheated plate ensures uniform contact. The duration of hot contact is 1 minute. A faithful transfer of the design, the penetration of which is excellent, is thus achieved.

Instead of the design, it is also possible to use only one ink and to coat the entire surface of the strip of paper so as to have, after transfer onto the carpet, no longer a design but a uniform dyeing in a single colour which has penetrated well.

EXAMPLE 4

Employing a machine with a rotating frame, a pattern is printed on a strip of paper of width 1.60 m, by means of aqueous inks containing polyvinyl alcohol or carob gum as the binder (thickener) and the following compounds as dyestuffs:

a. 8 parts of 1,4-di-isopropylamino-anthraquinone (blue ink),
b. 7 parts of 1,4-di-isopropylamino-anthraquinone and 2 parts of 1-amino-2-methyl-anthraquinone (olive green ink),
c. 6 parts of 1-amino-2-methoxy-4-hydroxy-anthraquinone and 4 parts of 1,4-di-isopropylamino-anthraquinone (violet ink),
d. 8 parts of 1-amino-2-methyl-anthraquinone and 3 parts of 1-amino-2-chloro-4-hydroxy-anthraquinone (red-brown ink),
e. 8 parts of 1-amino-2-methyl-athraquinone (orange ink) and
f. 4 parts of 1-amino-4-hydroxy-2-chloro-anthraquinone and 4 parts of 1-amino-2-methyl-anthraquinone (red ink).

In order to transfer the design from the strip of paper onto a carpet or a felt made of polyamide, the paper is placed in contact with the textile and the whole is passed over a calender heated to 205° C, the duration of contact being 50 seconds. Faithful transfer of the design, the penetration of which is excellent, is thus achieved.

Excellent penetration is also obtained by heating at 195° C for 3 minutes or at 170° C for 4 minutes.

We claim:

1. In a method for the dry transfer printing or dyeing of synthetic materials which comprises bringing the synthetic material to be dyed or printed into contact with a flexible temporary carrier sheet printed with printing ink containing at least one dyestuff which vaporizes or sublimes under transfer conditions, heating the thus contacted material and carrier sheet to a temperature of from 150° to 250° C for a period of time sufficient to effect transfer of dyestuff from the carrier to the said material and separating the said material from the said carrier sheet, the improvement according to which
   (a) the material is synthetic polyamide material having a thickness of at least 0.9 mm.,
   (b) the method is conducted in the absence of in vacuo conditions,
   (c) the heating step is carried out for a period of from 30 to 300 seconds, and
   (d) at least one of the dyestuffs is a member of the group consisting of 1,4-di(isopropylamino)-anthraquinone, 1,5-di(isopropylamino)-anthraquinone, 1-amino-4-hydroxy-2-chloro-anthraquinone, and 1-amino-2-methyl-anthraquinone.

2. A method according to claim 1 wherein the temporary carrier sheet bears a thermoplastic film over the printed layer.

3. A method according to claim 1 wherein the base of the temporary carrier sheet is a member selected from the group consisting of a thin sheet of aluminum, a thin sheet of aluminum backed with paper, a sheet of cellophane and a sheet of paper.

4. A method accoring to claim 1 wherein the base for the temporary carrier sheet is sulfuric acid-treated paper or parchment paper.

5. A method according to claim 1 wherein the temporary carrier sheet carries a water-soluble binder.

6. A method according to claim 1 wherein the temporary carrier sheet carries a solvent-soluble binder.

7. A method according to claim 6 wherein the binder is a cellulosic binder soluble in organic solvents.

8. A method according to claim 7 wherein the cellulosic binder is a cellulosic ether of an aliphatic alcohol.

9. A method according to claim 1 wherein the synthetic material is dyed or printed in a single shade.

10. A method according to claim 1 wherein the heating process is carried out at a temperature of between 180° and 220° C.

* * * * *